United States Patent Office 3,049,427
Patented Aug. 14, 1962

3,049,427
PROCESS FOR THE PREVENTION OF AFTER COOKING GRAY DISCOLORATION IN POTATOES AND OTHER VEGETABLES
John C. Fellers, Bridgeton, and Edward L. Morin, Vineland, N.J., assignors to Seabrook Farms Co., Division of Francis H. Leggett & Co., Seabrook, N.J., a corporation of New York
No Drawing. Filed July 28, 1959, Ser. No. 829,965
12 Claims. (Cl. 99—154)

This invention relates to a method of treating vegetables to prevent after-cooking discoloration, and more particularly relates to such a method for treating white potatoes.

The sale of pre-cooked foods, particularly vegetables, in a preserved form such as in frozen packages has become exceedingly more prevalent as time goes by. One vegetable which is highly susceptible to this form of processing is the white potato which is made and sold in appreciable quantities in a variety of ways including, for example, dehydro-frozen potatoes, dehydrated, flaked, frozen french fried, rissole, whole boiled, patties, mashed or diced. Although considerable success has been experienced in such processing, one troublesome problem that sporadically occurs is discoloration or graying which suddenly appears after the potatoes are cooked or heated.

It is generally believed that this discoloration is associated with the presence of traces of certain metals, such as iron; and attempts have, therefore, been made to utilize chelating or sequestering agents to neutralize these discoloring influences. One type of chelating compounds successfully used in the prevention of discoloration in seafoods are those of the ethylenediamine tetraacetic acid (EDTA) type as described in U.S. Letters Patent 2,669,520. However, attempts to use these and other chelating agents upon vegetables such as potatoes have failed. One of these attempts is described in an article entitled "Effect of Complexing and Chelating Agents on the After-Cooking Discoloration of Potatoes and Upon the Iron and Phenolic Content of the Juice," by Hunsader and Hanning, published on pages 269–273 of Food Research, volume 23, No. 3, May-June 1958, by the Institute of Food Technologists. However, these and other similar experiments utilizing EDTA have failed because the experimentors were unaware of the unexpected criticality of applying the reagent solution to vegetables in the presence of the very heat that triggers their discoloration.

An object of this invention is accordingly to provide a method of treating vegetables such as white potatoes to prevent after-cooking discoloration.

Another object is to provide such a method which utilizes economical reagents; and A further object is to provide such a method which can be accomplished with a minimum of disruption of the normal processing routine.

In accordance with this invention, the vegetables are contacted with a solution of a soluble compound of ethylenediamine tetraacetic acid in the presence of relatively high temperatures, for example, from 120° F. to 212° F., long enough to permit heat at these temperatures to penetrate throughout all portions of the vegetable in the presence of the reagent solution. This operation is particularly advantageously accomplished during the usual blanching operation during which the potatoes are maintained within this heat range for a long enough period of time to provide complete heat penetration. When this treatment is accomplished as described, the potatoes remain completely free of discoloration thereafter in contrast to heretofore normal conditions when mere exposure to this same heat results in permanent discoloration.

The concentration of EDTA in parts by weight of solution is advantageously maintained, for example, from 0.03% to 0.7%, and the pH should be maintained above 2 and less than 9, and preferably at approximately 3 when an aluminum sulfate complex is used. A particularly effective compound for use in this method to prevent discoloration in potatoes and which maintains a preferable white color is a complex of ethylenediamine tetraacetic acid and aluminum sulfate, particularly in the combination of two parts by weight of aluminum sulfate to 1 part of EDTA.

Various substances containing soluble EDTA compounds or their soluble salts have been found useful for the treatment of this invention. The principal requirement of these compounds is that they do not incorporate any substances which might cause discoloration, such as certain iron compounds; and these materials must, of course, be effective when used in concentrations at which they are nontoxic. The relatively nontoxic sodium salts are particularly effective, and disodium ethylenediamine tetraacetic acid in, for example, a .7% solution has been found quite effective. In fact, it has been in some cases effective in a concentration as low as 0.2% by weight. Ethylenediamine tetraacetic acid, itself, is effective when used in a 0.5% solution by weight with water, and in some cases has been found effective in solutions of as little concentration as 0.05% by weight. Other effective compounds are hydroxyethyl ethylenediamine triacetic acid and diethylenetriamine pentaacetic acid, and these have been found generally effective in a 0.35% solution and some cases in as little as 0.05% solution. Whenever a concentration is given herein, it refers to a percentage by weight of the ultimate solution; and the diluent is, for example, water.

It has further been discovered that EDTA and its soluble salts have an unexpected synergism for this treatment when used together with aluminum sulfate. In this combination, the amount of EDTA reagent required for preventing discoloration is far less than when it is used alone. When, for example, two parts of aluminum sulfate are used together with one part of Na$_2$EDTA such as represented in the following formula:

$$2Al_2(SO_4)_3 \cdot Na_2EDTA$$

this complex is found effective to prevent discoloration when used in a 0.4% solution. In most cases, a 0.25% solution will be entirely effective, and in certain cases, as low as a 0.1% solution of the complex will be effective to prevent discoloration.

A summary of various EDTA compounds that have been effectively used in the treatment described herein are as follows:

Na$_4$EDTA, Na$_3$EDTA, Na$_2$EDTA, Ca$_2$Na$_2$EDTA, EDTA, Al$_2$Na$_2$EDTA, CHEL® DM Acid, and CHEL® 330 acid, and combination of these EDTA compounds with Al$_2$(SO$_4$)$_3$.

The names of materials including the prefix "CHEL" are trademarks of the Geigy Chemical Corporation of Saw Mill River Roads, Ardsley, New York, and their formulas and certain physical properties are listed as follows:

CHEL® DM ACID

*Hydroxyethyl Ethylenediamine Triacetic Acid*

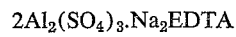

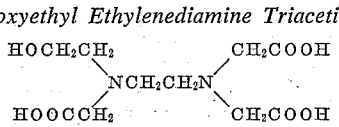

Molecular weight_____ 278
Melting point_____° C__ 159

Solubility/water (22° C.) _____ percent__ 4.4
pH aqueous solution _____ 2.3
Minimum purity _____ percent__ 98

CHEL® 330 ACID

*Diethylenetriamine Pentaacetic Acid*

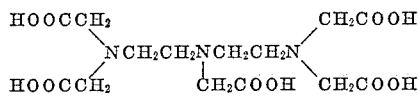

As previously mentioned, this treatment depends upon penetration of heat into the vegetable in the presence of a suitable reagent solution. A potato, for example, is treated between 120° F. to 212° F. Adequate penetration requires a longer time at lower temperatures than at higher. As much as one-half hour might be required to be effective at temperatures as low as 120° F. whereas only one minute might be required at temperatures between 190° F. to 212° F. Since the conventional potato-blanching operation is conducted at temperatures ranging from 180° F. to 212° F., the EDTA reagent is advantageously introduced into the blanching tank, and the vegetables are treated automatically as they are blanched. In blanching the potatoes are exposed to temperatures from 178° F. to 212° F. and usually at approximately 190° F. to inactivate the oxidizing enzymes. Furthermore, since the vegetables are washed or sprayed after blanching, this serves to maintain the amount of retained reagent at minimal levels; and it is, furthermore, unexpectedly helpful that thorough washing after treatment with the EDTA compound does not in any way decrease the effectiveness of its subsequent prevention of discoloration.

The use of concentrations of EDTA below the suggested ranges, usually does not provide effective prevention of discoloration, and the use of concentrations above those described usually imparts a residue above acceptable tolerance. In a similar manner the maintenance of a pH level below 2 causes an acid or sour flavor and above 9 results in a soapy flavor.

As previously mentioned, the time of treatment is greatly dependent upon heat penetration, and it generally may be described as varying with the applicable heat penetration curve. When the solution is maintained, for example, in a blanching tank at 212° F., as little as 40 seconds will be effective to prevent subsequent discoloration. However, if the temperature should drop to as low as 160° F., probably as long as 8 minutes of treatment would be required for effective discoloration prevention. Furthermore, the thickness of the potato determines the length and temperature of an effective dip. When, for example, the potato is cut into french fry style strips which are 7/16 by 7/16 inch thick, a dip of from 1 to 3 minutes in a 190° F. solution is effective to prevent subsequent discoloration.

In the following examples, treatment in a blanching tank at a temperature of approximately 190° F. is utilized, and the concentrations mentioned are to be considered in conjunction with this environment. Although it has been found that some control of discoloration can be effected by adding acids to the blanching water to bring about a pH level of less than 3, such a solution imparts a sour, acid flavor to the vegetables. Acidification of these solutions of EDTA compounds increases their effectiveness but, in most cases, imparts an acid flavor. Ethylenediamine tetraacetic acid alone is acid in solution with a pH of about 2.8 and when this is used in effective concentrations, it will impart an acid flavor. However, the combination of one part of an EDTA salt such as $Na_2EDTA$ plus $Al_2(SO_4)_3$ brings about a solution with a pH of approximately 3 which gives excellent control and does not impart the acid flavor. The $Na_2EDTA$ must be used in 0.3% to 0.4% concentrations to prevent discoloration, and it accordingly becomes quite expensive in the amounts required. The aluminum sulfate and sodium EDTA complex works to prevent discoloration in concentrations as low as 0.2% without giving any off-flavor and accordingly is found least expensive for the end use. Furthermore, it causes the potato to tend to whiter shades in contrast to the creamy color formed by the other reagents. This results together with the relative economy of this complex in its effective amounts costing less than ⅓ the cost of the other reagents here maintained.

Various commercial EDTA compounds such as the Geigy CHEL® 330 and CHEL® DM Acid have been found also to be quite effective in preventing graying in potatoes when used in 0.1% solution without imparting any off-flavor. It is expected that combinations of these compounds with aluminum sulfate may accordingly provide extremely effective discoloration-preventing reagents.

The reagents and method of treatment described herein are also effective in preventing discoloration in vegetables other than potatoes during the after cooking. These other vegetables are, for example, sweet potatoes, yams, cauliflower, and egg plant, and the aforementioned conditions of treatment have been found effective in treating them in a similar manner as with white potatoes. The universal applicability of treatment is highly unexpected and beneficial since any discoloration reagents heretofore used have been most selective in their action.

What is claimed is:

1. A method of treating vegetables to prevent after-cooking discoloration which comprises the steps of contacting said vegetables no later than the time of their initial subjection to a temperature which is high enough to trigger a substantial discoloring reaction with a solution of a soluble compound of ethylenediamine tetra-acetic acid, maintaining the pH of said solution in a range which does not impart an objectionable flavor to said vegetables, maintaining the concentration of said soluble compound by weight in said solution from 0.03% to 0.7% which is high enough to prevent said after-cooking discoloration and low enough to avoid exceeding the permissible residue concentration of said compound allowed in a vegetable, and maintaining the temperature of said vegetables during said contact from 120° F. to 212° F. for a time sufficient to permit heat within said temperature range to penetrate throughout said vegetables.

2. A method of treatment as set forth in claim 1 wherein the pH of said solution is maintained greater than 2 and less than 9.

3. A method of treatment as set forth in claim 1 wherein said contacting is accomplished during blanching operations, and said compound is incorporated in the blanching solution.

4. A method of treatment as set forth in claim 5 wherein approximately 2 parts of aluminum sulfate by weight are used with one part by weight of ethylenediamine tetraacetic acid.

5. A method of treating vegetables to prevent after-cooking discoloration which comprises the steps of contacting said vegetables no later than the time of their initial subjection to a temperature which is high enough to trigger a substantial discoloring reaction with a solution of a soluble compound of ethylenediamine tetra-acetic acid, maintaining the pH of said solution in a range which does not impart an objectionable flavor to said vegetables, maintaining the concentration of said soluble compound high enough to prevent said after-cooking discoloration and low enough to avoid exceeding the permissible residue concentration of said compound allowed in a vegetable, maintaining the temperature of said vegetables during said contact from 120° F. to 212° F. for a time sufficient to permit heat within said temperature range to penetrate throughout said vegetables, and said compound being a soluble salt of ethylenediamine tetraacetic acid in conjunction with aluminum sulfate.

6. A method of treatment as set forth in claim 1 wherein said vegetables are white potatoes.

7. A method of treatment as set forth in claim 3 wherein said vegetables are white potatoes.

8. A method of treatment as set forth in claim 1 wherein said temperature is maintained at approximately between 178° F. to 212° F.

9. A method of treatment as set forth in claim 8 wherein said contact is maintained for approximately two minutes.

10. A method of treatment as set forth in claim 1 wherein said vegetables are sweet potatoes.

11. A method of treatment as set forth in claim 1 wherein said vegetables are cauliflower.

12. A method of treatment as set forth in claim 1 wherein said vegetables are egg plant.

References Cited in the file of this patent

UNITED STATES PATENTS

| | | |
|---|---|---|
| 2,669,520 | Fellers | Feb. 16, 1954 |
| 2,846,317 | Bersworth | Aug. 5, 1958 |
| 2,910,368 | Melnick | Oct. 27, 1959 |

OTHER REFERENCES

"Food Research," vol. 23, No. 3, May-June 1958, pp. 269–273.

United States Dept. of Agriculture publication ARS–73–7 (May 1955) entitled "The After-Cooking Discoloration of Potatoes—A Review" (24 pages).